(12) United States Patent
McFeeters

(10) Patent No.: US 9,188,283 B2
(45) Date of Patent: Nov. 17, 2015

(54) TEMPERATURE MONITORING APPARATUS FOR A STEAM TRAP

(76) Inventor: Kenneth McFeeters, Newtownards Down (GB)

( * ) Notice: Subject to any disclaimer, the term of this patent is extended or adjusted under 35 U.S.C. 154(b) by 276 days.

(21) Appl. No.: 13/811,898

(22) PCT Filed: Jul. 26, 2011

(86) PCT No.: PCT/EP2011/062813
§ 371 (c)(1),
(2), (4) Date: Jan. 23, 2013

(87) PCT Pub. No.: WO2012/013664
PCT Pub. Date: Feb. 2, 2012

(65) Prior Publication Data
US 2013/0118614 A1    May 16, 2013

(30) Foreign Application Priority Data
Jul. 26, 2010 (GB) .................... 1012465.9

(51) Int. Cl.
*F16T 1/48* (2006.01)
*F16K 37/00* (2006.01)
*G01K 1/16* (2006.01)
*G01K 13/02* (2006.01)

(52) U.S. Cl.
CPC . *F16T 1/48* (2013.01); *F16K 37/00* (2013.01); *G01K 1/16* (2013.01); *G01K 13/02* (2013.01); *Y10T 137/3021* (2015.04); *Y10T 137/8158* (2015.04)

(58) Field of Classification Search
CPC ........... F16T 1/48; F16K 37/00; G01K 13/02; G01K 1/16; Y10T 137/8158; Y10T 137/8175
USPC ........... 137/551, 552; 374/183, 185, 29, 141, 374/134, 135, 179, 208
See application file for complete search history.

(56) References Cited

U.S. PATENT DOCUMENTS 2,379,712 A * 7/1945 Hildebrecht .................... 137/66
4,164,433 A * 8/1979 Granahan et al. ............. 136/229
(Continued)

FOREIGN PATENT DOCUMENTS

GB         2457924         9/2009

OTHER PUBLICATIONS

International Search Report for PCT/EP2011/062813, Completed by the European Patent Office on Jan. 30, 2014, 3 Pages.

*Primary Examiner* — Craig Schneider
*Assistant Examiner* — Josephine Trinidad-Borges
(74) *Attorney, Agent, or Firm* — Brooks Kushman P.C.

(57) ABSTRACT

A monitoring apparatus for monitoring the temperature of a body, the apparatus having a housing defining a volume of air exposed to the body, a temperature sensor being located within the volume of air at a position remote from the body whereby the temperature of the body can be determined. In one embodiment the housing defines a substantially vertically arranged flue exposed at its lower end to the body, the temperature sensor being located within the flue, at least one air inlet being provided in the flue positioned below the temperature sensor, at least one air outlet being provided in the flue positioned above the temperature sensor, whereby the body, when heated, may initiate a rising column of air within the flue due to convection when the temperature of the body is greater than the ambient temperature, the temperature sensor being exposed to said rising column of air.

27 Claims, 1 Drawing Sheet

(56) References Cited

U.S. PATENT DOCUMENTS

| | | | |
|---|---|---|---|
| 4,249,697 A * | 2/1981 | Savage, Jr. | 236/94 |
| 4,668,943 A * | 5/1987 | Bunker et al. | 340/606 |
| 2006/0118648 A1 * | 6/2006 | Armstrong et al. | 236/93 R |
| 2008/0150737 A1 | 6/2008 | Karschnia | |
| 2009/0170418 A1 * | 7/2009 | Codling | 454/66 |

* cited by examiner

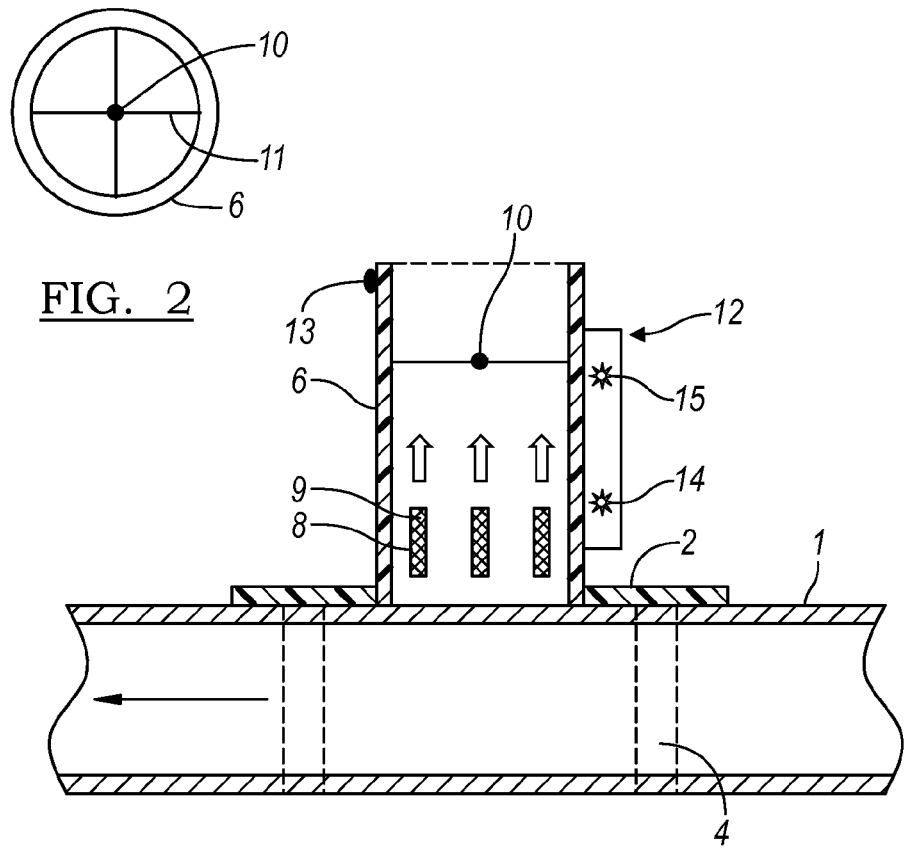
FIG. 2
FIG. 1
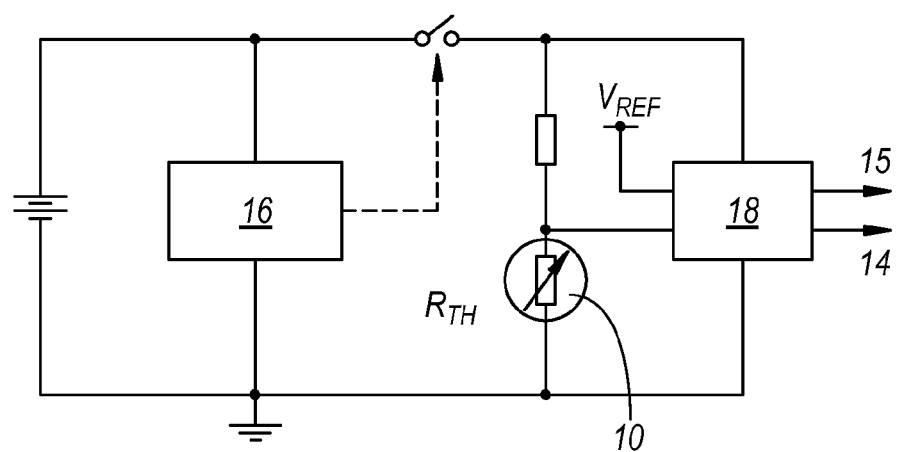
FIG. 3

TEMPERATURE MONITORING APPARATUS FOR A STEAM TRAP

CROSS-REFERENCE TO RELATED APPLICATION

This application is the U.S. national phase of PCT Appln. No. PCT/EP2011/062813 filed on Jul. 26, 2011, which claims priority to GB Patent Application No. 1012465.9 filed on Jul. 26, 2010, the disclosures of which are incorporated in their entirety by reference herein.

This invention relates to a temperature monitoring apparatus and in particular to a steam trap monitoring apparatus incorporating a temperature monitoring apparatus for determining the operating condition of a steam trap.

The duty of a steam trap is to discharge condensate, air and other incondensable gases from a steam system while not permitting the escape of live steam. Steam traps are automatic valves that open, close or modulate automatically to remove condensed liquids from a steam line. Mechanical steam traps typically comprise a float that rises and falls in relation to condensate level, the float being connected to a valve so that the position of the float opens and closes the valve in direct relationship to condensate levels present in the body of the steam trap to pass condensate into a condensate drain downstream of the valve.

Steam traps can fail fully open, wasting live steam to the condensate drain and causing a pressure loss in the system, or fully closed, causing a build up of condensate in the system and thereby causing water hammer effects and a loss of heat energy (live steam cools rapidly as it comes in contact with water).

A major problem with steam traps is the accurate identification of faulty traps. A steam system can typically include numerous steam traps and an inability to readily identify failed steam traps can lead to energy losses and other problems in the steam system. Inaccurate diagnosis and monitoring can cause perfectly good traps to be replaced unnecessarily. Accurate monitoring and diagnosis of steam traps is therefore important to any maintenance or energy management programme.

Historically, monitoring methods have included listening devices, optical sight glasses, temperature monitoring, and ultrasonic techniques. Prior art steam trap monitoring devices require substantial modification of the steam trap and often lack reliability in the harsh physical conditions encountered in steam systems and thus require a complete shut down of the steam system to permit replacement of a steam trap monitoring device. Therefore there is a desire to provide an improved steam trap monitor that can be readily retrofitted to existing steam traps and that be easily and reliably monitored to allow an operator to quickly assess the condition of a steam trap in a steam system and which allows the steam trap monitor to be readily replaced or installed without shutting down the steam system. Furthermore, any sensing equipment that relies on direct contact with, or insertion into, a steam trap or any steam pipe of a steam plant is exposed to a highly corrosive environment due to the high temperatures and high moisture levels involved, such corrosion problems being particularly severe where dissimilar metals are in contact with one another.

According to a first aspect of the present invention there is provided a monitoring apparatus for monitoring the temperature of a body, for example a pipeline, said apparatus comprising a housing defining a volume of air exposed to said body, a temperature sensor being located within said volume of air at a position remote from said body whereby the temperature of the body can be determined from the output of the temperature sensor.

Preferably the housing is formed from a thermally insulating material. The housing may be formed from a polymeric material or other non-metallic material, thus avoiding the corrosion problems associated by physical contact of dissimilar metals.

Such apparatus enables the temperature sensor to determine the temperature of the body at a position remote from said body. The reliability and operating lifetime of the temperature sensor is thereby enhanced.

Said temperature sensor may comprise a thermister or thermocouple.

Said apparatus may include an indicating means for indicating of the temperature of the body and/or the condition of an apparatus associated with the body, such as a steam trap, in response to the output of the temperature sensor.

The apparatus may comprise a microprocessor for operating the indicating means in response to the output of the temperature sensor. The microprocessor may be programmed to periodically sample the output of the temperature sensor.

Said indicating means may comprise one or more user perceptible indicator, such as lights, preferably in the form of light emitting diodes (LEDs), preferably flashing LEDs. Alternatively, or additionally, said indicating means may comprise a transmitter, transmitting an output signal to a remote monitoring device.

The temperature sensor, microprocessor and indicating means may be powered by batteries and/or by photovoltaic cells and/or a thermopile attached to a normally hot surface, which may be the same surface as the body whose temperature is being monitored.

The microprocessor and the indicating means may be mounted on said housing remote from said body, thereby isolating such components from the high temperature and harsh environment of the body, in particular where said body comprises a steam pipe or component part of a steam trap.

In one embodiment said housing may define a substantially vertically arranged flue exposed at its lower end to said body, said temperature sensor being located within said flue, at least one air inlet being provided in said flue at a position below said temperature sensor, at least one air outlet being provided in said flue at a position above said temperature sensor, whereby said body, when heated, may initiate a rising column of air within the flue due to convection when the temperature of the body is greater than the ambient temperature, said temperature sensor being exposed to said rising column of air.

Said at least one air inlet may be provided with a filter or screen to prevent dust and/or debris from entering the flue.

Preferably said temperature sensor is mounted at or adjacent said air outlet of the flue. Preferably the temperature sensor is mounted in a central region of the flue by means of one or more support arms or member, preferably by means of a plurality of radially extending support members.

According to a further aspect of the present invention there is provided a steam trap monitoring apparatus for determining the condition of a steam trap, said apparatus including a temperature monitoring apparatus in accordance with the first aspect of the invention for remotely monitoring the temperature of at least one part of the steam trap.

Preferably the temperature monitoring apparatus is mounted on the condensate drain of the steam trap to sense the temperature of the condensate drain. Preferably the indication means is adapted to provide an indication of the temperature of the condensate drain of the steam trap and thus an indication of the operating condition of the steam trap. A further temperature sensor may be provided for sensing the ambient air temperature adjacent the flue to enhance the accuracy of the temperature monitoring apparatus.

The temperature sensor preferably comprises a thermister, thermocouple or solid state temperature sensing device. The microprocessor may determine the temperature of the condensate drain by comparing the output of the sensor, such as the voltage drop across the thermister with predetermined reference values.

In one embodiment the indication means may comprise at least one LED, the microprocessor being programmed to alter a frequency or pattern of flashing or colour of the at least one LED to indicate the condition of the steam trap and/or the temperature of the condensate drain.

In one embodiment, said indicating means may comprise two lights, a first light being illuminated when the temperature sensed by the temperature sensor is below a first predetermined value, indicative of a first failure mode of the steam trap, and a second light being illuminated when the temperature sensed by the temperature sensor is above a second predetermined value, higher than said first predetermined value, indicative of a second failure mode of the steam trap, whereby, under normal operating conditions of the steam trap, the temperature sensed by the temperature sensor will be between said first and second temperature such that neither light is illuminated.

When the steam trap is operating correctly, the temperature of the condensate drain is typically between 85° C. and 95° C. when the condensate drain is at atmospheric pressure (for example when it is vented to the atmosphere), corresponding to the temperature of the liquid condensate at atmospheric pressure. If the condensate drain is pressurised, for example if it is connected to a flash chamber to enable the recovery of steam therefrom, the temperature downstream of the steam trap during normal operation of the steam trap will be higher due to the higher pressure (typically 2 bar).

If the steam trap fails open, live steam escapes through the condensate drain and the temperature downstream of the steam trap increases to around 110° C. to 130° C., increasing the temperature of the condensate drain. If the steam trap fails closed, flow through the condensate drain ceases and the temperature downstream of the steam trap falls. Thus the temperature monitoring apparatus of the present invention may provide an indication of the status of the steam trap as a function by providing an indication of the temperature and pressure of the condensate drain thereof.

In one embodiment the apparatus comprises a clamp enabling the apparatus to be fitted to a condensate drain of the steam trap to place the lower end of the flue in thermal contact with the condensate drain.

Due to the ability of the temperature monitoring apparatus of the present invention to sense the temperature of the condensate drain remotely by the use of convection through the flue, there is no need for the attachment of separate sensors to the pipe work of the steam system and no need to disrupt the steam system during installation. Due to the relationship between temperature and pressure of steam, the indication means may be programmed to indicate the pressure of the steam trap as a function of the output of the temperature sensor.

An embodiment of the present invention will now be described with reference to the accompanying drawing, in which:

FIG. 1 is a sectional view of a temperature monitoring apparatus according to an embodiment of the present invention fitted to a condensate drain of a steam trap;

FIG. 2 is a sectional view through the flue of the apparatus of FIG. 1 showing the position of the temperature sensor; and FIG. 3 is a schematic diagram of the electrical circuit of the temperature monitoring apparatus of FIG. 1.

The temperature monitoring apparatus comprises a base member 2 attachable to a drain conduit of a steam trap by means of a copper or aluminium strap or clamp 4 extending around the drain conduit 1 of a steam trap.

A vertically arranged tubular flue 6 is mounted on the base member 2, the flue 6 having a plurality of slotted air inlets 8 around a lower end for allowing air to flow into the base of the flue 6 and being open at an upper end whereby air within the flue 6 may be heated by the surface of the drain conduit 1, causing a column of air to rise upwardly within the flue by natural convection. The air inlets 8 may be provided with metal screens 9 or filters to prevent debris and/or dust from entering the flue 6.

A temperature sensor 10, in the form of a thermister or thermocouple, is mounted in the centre of the flue 6 adjacent an upper end of the flue to be exposed to the rising column of air within the flue 6 to measure the temperature of the air within the flue 6, which is directly proportional to the temperature of the conduit 1. As shown in FIG. 2, the temperature sensor 10 may be mounted on radially extending support members 11, such as wires, to be located in the centre of the flue 6, minimising any restriction to the flow of air through the flue 6.

The flue 6 is preferably formed from a thermally insulating material, preferably a non-metallic material, to protect the electronics of the temperature monitoring apparatus from excessive heat and to ensure that the only source of heat to which the temperature sensor 10 is exposed is the convection current within the flue resulting from the temperature of the drain conduit 1.

A controller 12 incorporating a microprocessor, a power source, such as one or more batteries, and an indicating means, such as two or more LEDs, is mounted on the side of the flue. In the embodiment shown, the body of the controller 12 is provided with two vertically spaced LEDs 14,15 for providing an instant visual indication of the status of the steam trap to which the apparatus is attached, as will be described below in more detail.

Alternatively, or additionally, the controller 12 may comprise an audible warning device to provide an audible indication of the status of the steam trap, particularly where the status of the steam trap indicates a fault, and/or may include a transmitter for transmitting status information concerning the condition of the steam trap to a remote monitoring device.

As shown in FIG. 3, a microprocessor 16 is incorporated into the device. The microprocessor 16 is connected to the thermister 10 and utilises the voltage drop across the thermister 10 to determine the temperature of the rising column of air within the flue 6 and thus the temperature of the drain conduit 1 of the steam trap.

The microprocessor 16 is programmed to provide a visual indication of the status of the steam trap, corresponding to the temperature of the condensate drain 1, by illuminating the LEDs 14,15 depending upon the determined temperature of the condensate conduit 1. For example, illumination of the lower LED 14 may indicate a lower temperature, indicative of a blocked or failed closed steam trap. Illumination of the upper LED 15 may indicate a high temperature indicative of a failed open steam trap. When the steam trap is operating correctly, the temperature of the condensate drain is typically between 85° C. and 95° C., corresponding to the temperature and pressure of the liquid condensate. Under such condition neither of the LEDs 14,15 are lit.

If the steam trap fails open, live steam escapes through the condensate drain 1 and the temperature of the condensate drain increases, typically to around 110° C. to 130° C. when the condensate drain is vented, increasing the temperature of the condensate drain 1. This increases the temperature of the air within the flue 6 and the rising heated air heats the thermister 10. The resulting change in voltage drop of the thermister is detected by a window comparator 18 causing illumination of the upper LED 15.

If the steam trap fails closed, flow through the condensate drain 1 ceases and the temperature of the condensate drain falls. This fall in temperature of the condensate drain 1 causes a corresponding fall in temperature of the air within the flue 6, which is sensed by the thermister 10 causing the microprocessor 16 to illuminate the lower LED 14.

Thus the temperature monitoring apparatus of the present invention may provide an indication of the status of the steam trap as a function by providing an indication of the temperature of the condensate drain thereof.

One or more batteries may be provided to supply power to the microprocessor 16. The one or more batteries may be charged by means of photovoltaic cells or a thermopile or may be replaced by such alternative power sources. A separate thermopile may be provided for connection to a hot part of the steam system, such as a live steam conduit, to provide a power supply for the monitoring apparatus.

The LED 14,15 may comprise flashing LEDs operating on a short duty cycle to conserve battery life. Alternatively a semaphore signalling may be used, using a pulsed electromechanical actuator.

A further temperature sensor 13 may be provided for sensing the ambient air temperature around the flue, representing the exterior environmental conditions adjacent the flue. The signal from such further temperature sensor may enable the microprocessor to compensate for fluctuations in temperature within the flue due to the ambient temperature, in particular caused by windy or drafty conditions.

Whilst the preferred embodiment is described in relation to a monitoring apparatus for monitoring the condition of a steam trap, the monitoring apparatus according to the present invention may be used wherever it is desired to monitor the temperature or a temperature dependent property of a body, for example to monitor the temperature of a fluid flowing within a pipeline or wherever it is required to monitor the temperature of a body without placing a temperature sensor and associated sensing circuitry in direct contact with such body.

The monitoring apparatus may be used as a pressure sensor in a steam plant due to the proportional relationship between temperature and pressure in a steam conduit. The monitoring apparatus may therefore be used as a more reliable replacement for potentially unreliable pressure sensors in a steam conduit. Such known pressure sensors typically comprise mechanical devices exposed to the steam within a steam conduit. By contrast, the use of a monitoring apparatus in accordance to the present invention enables the pressure within a steam conduit to be determined based upon the remote measurement of temperature without requiring direct contact with the steam conduit or exposure of the monitoring apparatus to steam.

Pressure sensors are typically used upstream and downstream of a pressure reducing valve to monitor the operation and condition of the pressure reducing valve. The monitoring apparatus of the present invention would be particularly suited to provide a more reliable solution.

The invention is not limited to the embodiment(s) described herein but can be amended or modified without departing from the scope of the present invention.

The invention claimed is:

1. A monitoring apparatus for monitoring the external temperature of a body containing a fluid, said apparatus comprising a housing defining a volume of air exposed to an external surface of the body, a temperature sensor being located within said volume of air at a position remote from said body whereby the temperature of the body can be determined from an output of the temperature sensor.

2. The monitoring apparatus as claimed in claim 1, wherein said housing is formed from a thermally insulating material.

3. The monitoring apparatus as claimed in claim 1, wherein the housing is formed from a polymeric material or other non-metallic material.

4. The monitoring apparatus as claimed in claim 1, wherein said temperature sensor comprises a thermistor or thermocouple.

5. The monitoring apparatus as claimed in claim 1, wherein said apparatus includes an indicating means for indicating the temperature of the body and/or the condition of an apparatus associated with the body, in response to the output of the temperature sensor.

6. The monitoring apparatus as claimed in claim 5, further comprising a microprocessor for operating the indicating means in response to the output of the temperature sensor.

7. The monitoring apparatus as claimed in claim 6, wherein the microprocessor is programmed to periodically sample the output of the temperature sensor.

8. The monitoring apparatus as claimed in claim 5, wherein said indicating means comprises one or more user perceptible indicators.

9. The monitoring apparatus as claimed in claim 5 wherein said indicating means comprises one or more lights or a transmitter for transmitting an output signal to a remote monitoring device.

10. The monitoring apparatus as claimed in claim 1, wherein said at least one air inlet is located at or adjacent the lower end of the flue.

11. The monitoring apparatus as claimed in claim 1, wherein said at least one air outlet is provided at an upper end of the flue.

12. The monitoring apparatus as claimed in claim 1, wherein said at least one air inlet is provided with a filter or screen to prevent dust and/or debris from entering the flue.

13. The monitoring apparatus as claimed in claim 1, wherein said temperature sensor is mounted at or adjacent said air outlet of the flue.

14. The monitoring apparatus as claimed in claim 1, wherein the temperature sensor is mounted in a central region of the flue by means of one or more support arms or member.

15. The monitoring apparatus as claimed in claim 14, wherein the temperature sensor is mounted in the central region of the flue by a plurality of radially extending support members.

16. The monitoring apparatus as claimed in claim 1, wherein the apparatus is powered by batteries and/or by photovoltaic cells and/or a thermopile attached to a normally hot surface.

17. The monitoring apparatus as claimed in claim 16, wherein said normally hot surface comprises the body whose temperature is being monitored.

18. The monitoring apparatus as claimed in claim 5, wherein the indicating means is mounted on the housing at a position remote from said body, thereby isolating components thereof from the high temperature and harsh environment of the body.

19. A steam trap monitoring apparatus for determining the condition of a steam trap having a condensate drain, said apparatus including a temperature monitoring apparatus as claimed in claim 1, for remotely monitoring the temperature of at least one part of the steam trap.

20. The steam trap monitoring apparatus as claimed in claim 19, wherein the temperature monitoring apparatus is mounted on a condensate drain of the steam trap to sense the temperature of the condensate drain.

21. The steam trap monitoring apparatus as claimed in claim 20, wherein the apparatus is adapted to provide an indication of the temperature of the condensate drain of the steam trap and thus an indication of the operating condition of the steam trap.

22. The steam trap monitoring apparatus as claimed in claim 21, wherein the temperature of the condensate drain is determined by comparing the output of the temperature sensor with predetermined reference values.

23. The steam trap as claimed in claim 19, wherein a further temperature sensor is provided for sensing the ambient air temperature adjacent the housing to enhance the accuracy of the temperature monitoring apparatus.

24. The steam trap monitoring apparatus as claimed in claim 19, wherein said apparatus includes an indicating means for indicating of the temperature of said at least one part of the steam trap, in response to the output of the temperature sensor.

25. The steam trap monitoring apparatus as claimed in claim 24, wherein the indication means comprises at least one light source, wherein a frequency pattern of flashing or colour of the at least one light source is controlled to indicate the condition of the steam trap and/or the temperature of said at least one part of the steam trap.

26. The steam trap monitoring apparatus as claimed in claim 25, wherein said indicating means comprises two lights sources, a first light source being illuminated when the temperature sensed by the temperature sensor is below a first predetermined value, indicative of a first failure mode of the steam trap, and a second light source being illuminated when the temperature sensed by the temperature sensor is above a second predetermined value, higher than said first predetermined value, indicative of a second failure mode of the steam trap, whereby, under normal operating conditions of the steam trap, the temperature sensed by the temperature sensor will be between said first and second predetermined values such that neither light source is illuminated.

27. The steam trap monitoring apparatus as claimed in claim 19, comprising a clamp enabling the apparatus to be fitted to a condensate drain of the steam trap to place a lower end of the housing in thermal contact with the condensate drain.

\* \* \* \* \*